Dec. 28, 1965     I. EZOPOV     3,226,020
SLIDE RULE CIRCULAR TYPE, WITH ENLARGED SCALES
Filed March 29, 1965     2 Sheets-Sheet 1

INVENTOR.
IGOR EZOPOV

Dec. 28, 1965                I. EZOPOV                3,226,020
            SLIDE RULE CIRCULAR TYPE, WITH ENLARGED SCALES
Filed March 29, 1965                            2 Sheets-Sheet 2
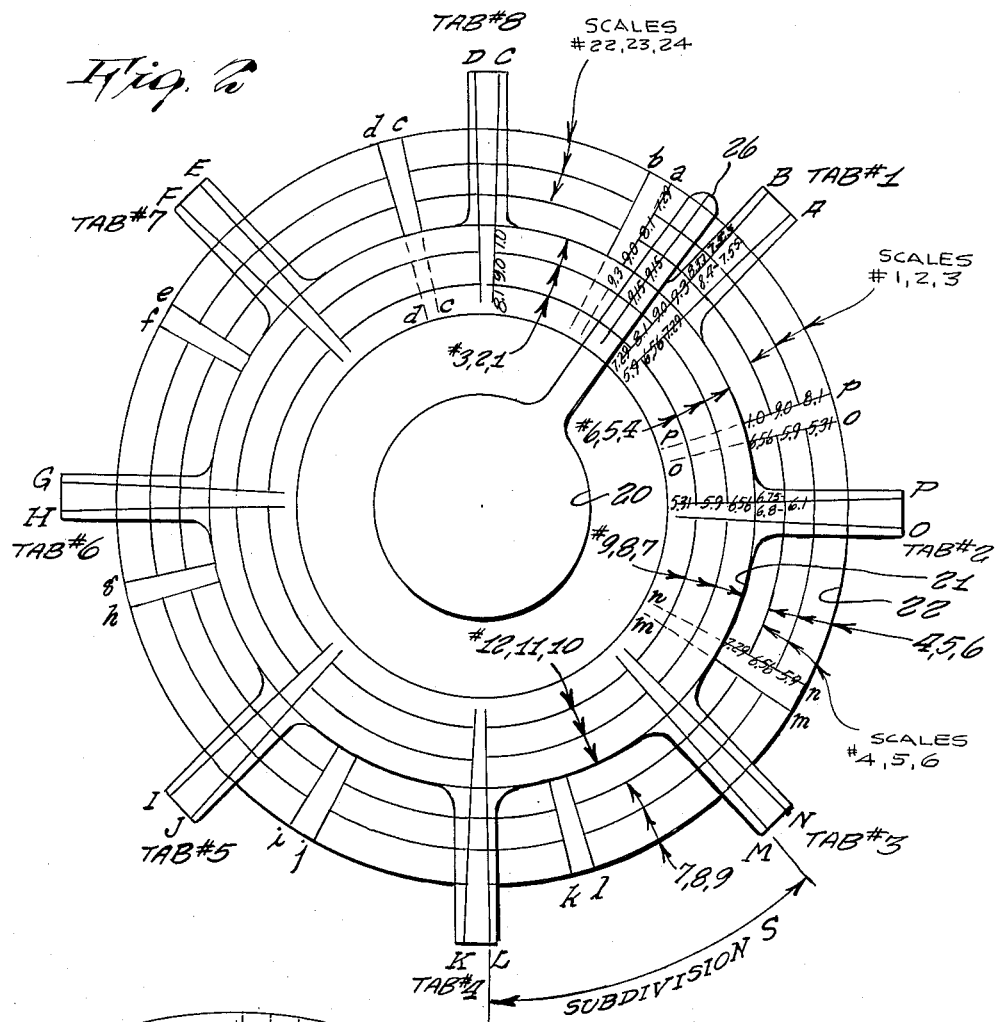
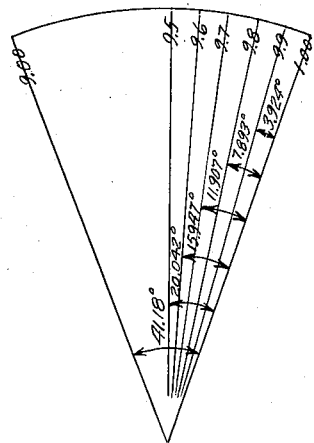
INVENTOR.
IGOR EZOPOV

United States Patent Office

3,226,020
Patented Dec. 28, 1965

3,226,020
SLIDE RULE OF CIRCULAR TYPE,
WITH ENLARGED SCALES
Igor Ezopov, 336 Union Ave., Brooklyn, N.Y.
Filed Mar. 29, 1965, Ser. No. 443,448
5 Claims. (Cl. 235—84)

This invention relates to slide rules for performing mathematical functions to obtain a more accurate solution than what was previously possible in conventional slide rules, and more specifically is an improvement over circular slide rules of the type disclosed in United States Patent No. 3,071,321.

At the present time, slide rules, either straight line or circular, can present solutions with different grades of precision, depending upon part of the scale upon which the computation is performed where the solution is read, for example, the precision of scaler length on the slide rule between the numbers 9 and 10 (10 of course is also the same as 1.0 on the slide rule scale) which is arithmetically one unit, but which on a logarithmic scale, is approximately 6½ times smaller than the precision and scaler length between the numbers 1 and 2, which also is arithmetically equal to one unit.

Accordingly, it is an object of this invention to provide a circular slide rule of simple construction that is more accurate for every part of the slide rule scale, and thereby making it more accurate for the critical portion of the slide rule scale which lies between 9 and 10, and which is generally the most inaccurate part of the conventional slide rule scale.

It is another object of this invention to provide a circular slide rule which, in addition to being more accurate for every portion of the slide rule scale, will be specifically adapted to utilize the advantages disclosed in the slide rule in Patent No. 3,071,321 by the same inventor.

A further object of this invention is to substantially increase the accuracy and length of the slide rule scale without substantially increasing the over-all physical dimensions of an equivalent conventional circular slide rule.

Another object of this invention is to provide a slide rule for exact readings of problems with 3, 4 and 5, and even more, digits, when special need for such a reading exists in making computations in science and engineering.

These and other objects of the herein-below disclosed novel circular slide rule, will become apparent by referring to the following description and attached drawings. It is understood that the drawings are for illustrative purposes only, and are not to be used as limiting the scope of the invention.

FIGURE 2 is a plan view of the slide rule of FIGURE 1, showing a position for a specific set of computations;

FIGURE 4 is a graphic chart showing the relationship between the angular and scaler distances on the slide rule.

Figure 1:
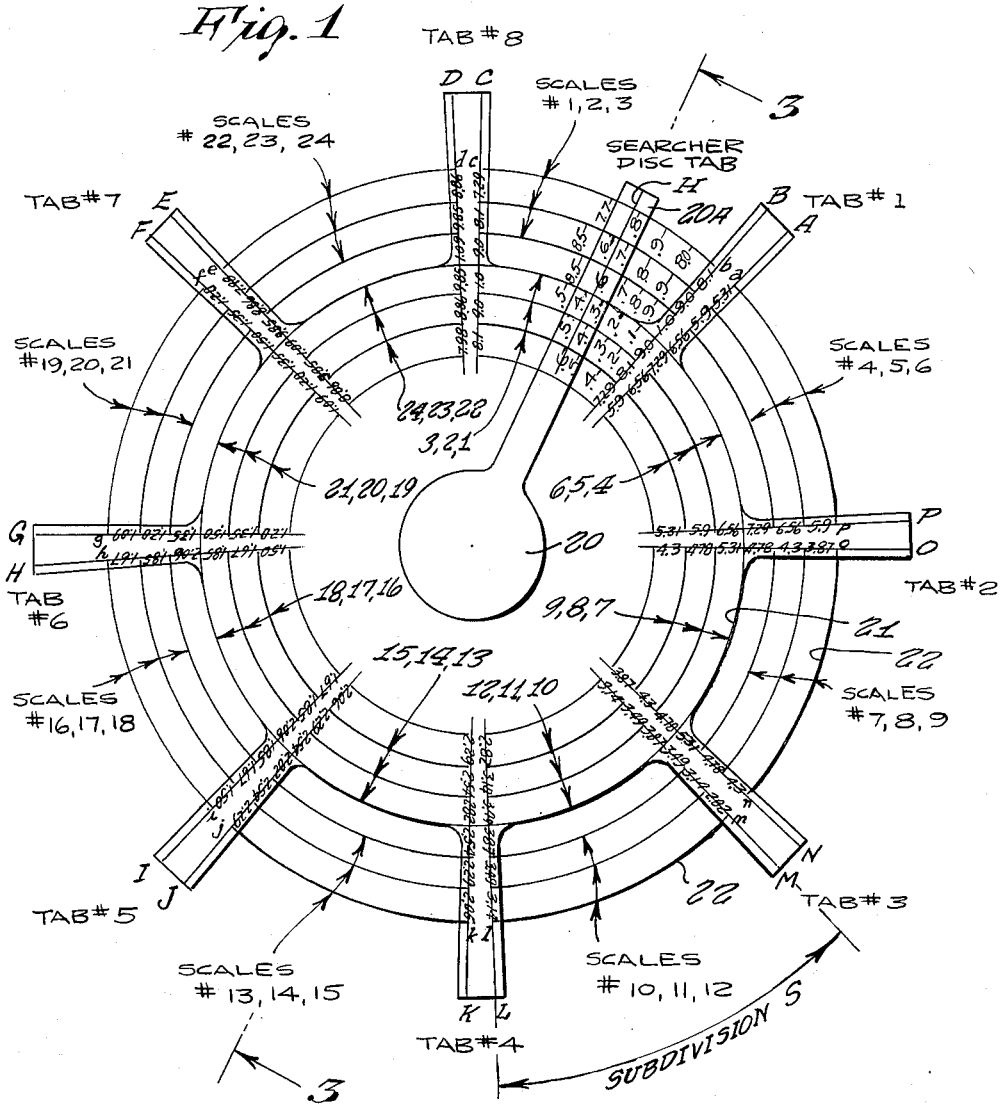
FIGURE 1 is a plan view of a circular slide rule with enlarged scales constructed in accordance with the invention.
Figure 3:
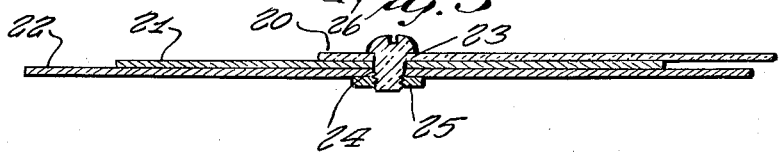
FIGURE 3 is a cross-sectional view of the slide rule of FIGURES 1 and 2 taken along plane 3—3 showing construction details.

To facilitate the description of the invention, it will be noted that a specific number of enlarged concentric logarithmic scales are shown in the drawings which will be used for the purposes of illustration and description. These illustrations and descriptions however, should not be construed as defining a limitation of the scope of the invention, inasmuch as the number of concentric scales can be varied in accordance with the specific accuracy desired for a slide rule of certain predetermined dimensions. This will become apparent upon the herein-below more detailed description.

Referring now to the drawings of the slide rule, as shown with concentric discs 20, 21 and 22:

Disc 20 will be referred to as the searcher tab disc, since its function is mainly in aligning numbers on the different discs in performing computations. The discs have aligned central openings 23, 24 and 25, respectively, with a pivot pin 26 which fastens the disc together and permits their rotation relative to each other. The discs 21 and 22 progressively decrease in diameter, and are provided with peripheral concentric logarithmic scales divided into 24 equal subdivisions or parts, each part or subdivision being spaced from each other for purposes as will be described hereinafter; each subdivision spans 2½ times the angle which is spanned in a conventional circular slide rule. This is made possible by the increased lengths afforded by the concentric circles, and by the manner in which the logarithmetic scales are laid out on said circles, permitting functions to be performed in a manner similarly disclosed in Patent No. 3,071,321. The angle spanned by each subdivision is 41.18 degrees, which is 2½ times the angle span in a conventional slide rule of 16.475 degrees. The angular distance between the numbers 10 and 9, 9 of 8.1, 8.1 of 729, 729 of 6.56, 6.56 of 5.9, etc., as is shown in FIGURE 1, is constant and equal to 41.18 degrees. However, it should be understood that this angular distance can be increased or decreased, depending upon the number of concentral circles that are utilized, or by the dimensions of the slide rule. What is important to realize however, is that for the same overall dimensions of a slide rule, we are in this specific instance provided with a slide rule which has 2½ times the accuracy of the conventional slide rule, and represents logarithmetic numbers which are multiples of 9. In other words, it represents pairs of 9. For example, an entire scale unit ranging from 1.0 to 10.0 comprises 21.8 equal subdivisions $s$ before a second entire scale unit is started on this slide rule. This last subdivision on the scales is No. 24. Each of the scale subdivisions from 1 to 24 of the disc 21 is oppositely arranged with respect to the scales 1 to 24 of the disc 22. Please note that the concentric portions of the scale included within any subdivision, are numbered consecutively, for example, on disc 22 (FIGURE 1) between the lines $b$ and $c$, you will find scales 1 to 3 with the innermost concentric scale being scale number 1, and the outermost concentric scale being number 3. However, the concentric scales on disc 21 for the same subdivision as seen in FIGURE 1, are numbered oppositely in a radial direction in that scale No. 1 is the outermost scale on disc 21, and scale No. 3 is the innermost. Similarly, the other subdivision continue consecutively, reading in the same radial directions as described in connection with scales 1, 2 and 3.

It is extremely important in making computations and reading the results, to know exactly which numbered scale on both discs 21 and 22 is being utilized in this specific computation, as will be understood from descriptions herein-below.

The boundaries of each subdivision $s$ of disc 21 are aligned by radial hair-lines emanating from the axis or center of the discs, or which in this case, is the axis of pivot pin 26, being the center of the entire slide rule. The said hair-lines are designated as A, B, C, D, E, etc. in a counter-clockwise direction. These lines extend beyond the periphery of disc 21 along transparent tabs numbered 1 through 8 (FIGURE 1), and the letters A, B, C, etc. are shown adjacent the said tabs. In a corresponding manner, the boundaries of the subdivisions of disc 22 are also defined by radial lines $a$, $b$, $c$, $d$, etc. (See in particular FIGURE 2.) The tabs are provided for reading results of multiplication on the proper scale, as will be described. The inner continuations of the lines $a$, $b$, $c$,

*d*, etc. on disc 22 are covered by disc 21, unless disc 21 is made transparent. Tabs of disc 21 can be eliminated, and the reading performed on a radial inner portion of disc 22 when disc 21 is made transparent. If disc 21 is not made transparent, then of course, one must employ the transparent tabs as shown in FIGURE 1, in order to align and read results. In the specific position shown in FIGURE 1, the radial lines of concentric discs 21 and 22 coincide exactly, inasmuch as this is a special position which may occur in a computation. In the position shown in FIGURE 2, the radial lines of the said disc do not coincide, and the position of the boundary lines on disc 22, which underlie disc 21, are shown as dotted for some of the boundary lines, in order to indicate that they may be extended thereunder for the instance where the disc 21 is a transparent disc, as described above. However, in the specific computations to be used, FIGURES 1 and 2 herein are meant to represent the type of construction where disc 21 is not transparent, and the transparent tabs 1, 2, 3, etc. are employed.

The specific position of FIGURE 2, wherein the hair-lines on both discs do not coincide, will be the most general position. However, it will be necessary to make clear a computation that is performed when the disc lines do coincide, and this will be entered into before proceeding with the more general case.

Accordingly, again referring to FIGURE 1, an example of a multiplication problem will now be described. Thus, to solve the simple multiplication problem as shown on scales numbers 1 of both discs 21 and 22, note that 9.6 on disc 22 (scale No. 1), is aligned with 9.38 on disc 21 (scale No. 1) by means of the hair-line on disc 20. The product is approximately 90, as one can realize instantly. The accurate result is 90, and can be read either on scale No. 1, disc 22, under hair-line C of tab No. 8, or if disc No. 21 is transparent, on scale No. 1, disc 21, above the hair-line *b* of disc 22.

To divide 90 by 96, the number 90 of scale No. 1, disc 22, is aligned with hair-line C of disc 21, and opposite to the No. 96 on scale No. 1, disc 22, is the answer .938 of scale 1, disc 21. Similarly, if no tabs are provided on disc 21, and disc 21 is transparent, then No. 90 of scale No. 1, disc 21, is above line *b*, and opposite to 96 on scale 1, disc 22, one reads the answer .938 on scale 1, disc 21. The result of multiplication of 90 can be read not only by means of lines C and *b*, as shown previously, but by means of line B or *c*. In this case, the scale for results is No. 2 and not No. 1. Similarly, the multiplication or division can be performed with numbers of every other two scales on discs 21 and 22, and results can be read on the proper scale with proper hair-lines utilized.

In order to facilitate determining which scale to read, the results of any multiplication, division or series of multiplication and division, the following rules have been evolved and can be very easily learned and utilized almost automatically.

Rule No. 1. Add the numbers of the two scales used in any multiplication, and from the sum, substract 1. The resulting number will determine the number of the scale for reading the results. Refer to the example shown in FIGURE 1, wherein the product of 7.59 by 8.65 involves scales No. 3 and No. 2. Thus, three plus 2 equals five, and five minus 1 equals four. Therefore, the scale No. 4 is used for reading the result, and this will be verified by referring to FIGURE 1. This rule can be applied for reading with hair-lines A, C, E, G, I, K, M or O of disc 21, or with *b, d, f, h, j, l, n* or *p*, of disc 22.

Rule No. 2. The sum of the two scale numbers used in a multiplication, determines the number of the scale to read the results. Thus, for the computation used in the preceding example, three plus two is five. The result can be read at the hair-line B on scale 5, on disc 22 or 21, said result being as can be verified, 6.56.

Rule No. 2 is particularly useful for reading hair-lines B, D, F, H, J, L, N, or P, that is, the hair-lines not enumerated for use with Rule No. 1, or with small letters *a, c, e, g, i, k, m*, or *o*, on disc 22. Thus, it is seen that certain hair-lines are used when Rule No. 1 is applied, and the other hair-lines are used when Rule No. 2 is applied. It may be more convenient for any particular computation, to use either Rule 1 or Rule 2, and then of course, the appropriate hair-lines should be employed in reading the results.

Referring now to FIGURE 2, a computation will be described for a specific computation, wherein the hair-lines on the disc do not coincide. For example, the computation shows the multiplication of 9.15 by 9.15, which is aligned on scales 1 of both discs 21 and 22 by the hair-line on searcher tab disc 20 obviously by mental computation. The total is somewhere more than 8.1. In the use of conventional slide rules, it is usually the best practice to make the best mental test of the result to verify whether one is arriving at a logical solution. Thus, if we now apply Rule No. 2, inasmuch as it is most convenient to read hair-line B, we will note that the sum of the scale numbers is 1 plus 1 equals 2. Thus, we should be able to read the result on scale No. 2 under hair-line B, and we note the said result is 8.37, which of course is the correct result. It should be noted that in a conventional slide rule of this over-all dimension, the last digit, that is, 5, in the number 8.35 would have been an estimate rather than an accurate reading, and this is the great value that this improved slide rule performs, in addition to the advantages that are provided in accordance with the disclosure in my previous Patent No. 3,071,321. If one were to have used Rule 2, instead of Rule 1, then the result could have been read on scale No. 2 of disc 22, under hair-line *c*.

Thus, it is seen that in addition to being able to perform a plurality of computations simultaneously, because of the concentricity of the circles, and to be able to read results in a plurality of places on the slide rule, the novel slide rule described herein, also at the same time provides a much greater accuracy, permitting one to read accurately, digits which previously could only be estimated by the user.

Thus, it is apparent that the above described slide rule increases the accuracy of the entire scale 2½ times in the instance described herein, and which of course can increase the accuracy much more by using additional concentric scales, and therefore, the portion of the slide rule scale between 9 and 10, or in general, the portion of the slide rule towards the higher numbers, can be made more accurate, and thus make slide rule computations more acceptable for more accurate work, and thus provide scientists, engineers, and other technical persons, with a very convenient and simple means for performing, rapid, accurate computations. It should be understood of course, that the selection to increase the scale accuracy 2½ times, is arbitrary, just to provide a specific example for the reader, and that the scale accuracy can be increased as desired without generally increasing the over-all dimensions of the slide rule, which of course should be kept within reasonable proportions, so that it can be easily carried by the user.

I claim:

1. A circular slide rule comprising a plurality of circular discs pivotally mounted about the same central axis wherein the diameters of the said disc decrease in direction from the innermost to the outermost of the said discs in combination with a searcher disc tab mounted about the same axis, and superimposed over the said discs wherein said searcher tab is transparent and extends radially beyond the disc of the greatest diameter, and having a radial hair line for aligning pre-determined locations on the said discs, in further combination with a series of transparent reader tabs radially arranged about the axis of the slide rule, and equidistant from each other, said reader tabs being attached to the disc of smallest diameter, and extending beyond the disc of greatest diameter, and being provided with pairs of radially spaced hair lines having inward radial extensions on the disc of smallest diameter and wherein the spaces between the hair-lines on each of the reader tabs are equal, and wherein the spaces separating the hair-lines between each reader tab, are also equal.

2. A circuitous slide rule as in claim 1, wherein the disc of smallest diameter has a logarithmetic concentric circular scales thereon, wherein each of said scales are subdivided into equal segments, each segment being graduated in numbers descending in a clockwise direction, and the discs of larger diameters having similar concentric logarithmetic circular scales also subdivided into equal segments of the same angular distance about the axis of the slide rule, and wherein the scales on the discs of larger diameter are arranged in ascending order in a clockwise direction.

3. A circular slide rule as in claim 2, wherein the equal segments into which each of the scales are subdivided, are defined by radial lines separating each segment from each other, and forming a continuous extension with the hair lines on the reader tabs.

4. A slide rule as in claim 3, wherein the logarithmetic scales are formed from exponential powers of a number.

5. A circular slide rule as in claim 4, wherein each tier of scales in each segment form a smaller independent slide rule scale wherein the graduations are arranged in an order which ascends as one proceeds radially outward from the radial innermost scale segment.

References Cited by the Examiner

UNITED STATES PATENTS

| | | | |
|---|---|---|---|
| 2,440,415 | 4/1948 | Piper | 235—88 |
| 2,634,913 | 4/1953 | Sawyer | 235—84 |
| 3,071,321 | 1/1963 | Ezopov | 235—84 |

FOREIGN PATENTS 738,591  10/1955  Great Britain.

LEO SMILOW, *Primary Examiner.*

C. G. COVELL, *Assistant Examiner.*